(12) United States Patent
Lin et al.

(10) Patent No.: US 9,389,780 B2
(45) Date of Patent: Jul. 12, 2016

(54) TOUCH-CONTROL SYSTEM

(71) Applicant: Quanta Computer Inc., Kuei Shan Hsiang, Tao Yuan Shien (TW)

(72) Inventors: Chien-Hung Lin, Tao Yuan Shien (TW); Yun-Cheng Liu, Tao Yuan Shien (TW)

(73) Assignee: QUANTA COMPUTER INC., Guishan Dist., Taoyuan (TW)

( * ) Notice: Subject to any disclaimer, the term of this patent is extended or adjusted under 35 U.S.C. 154(b) by 198 days.

(21) Appl. No.: 14/287,641

(22) Filed: May 27, 2014

(65) Prior Publication Data

US 2015/0293689 A1    Oct. 15, 2015

(30) Foreign Application Priority Data

Apr. 11, 2014   (TW) .............................. 103113344 A

(51) Int. Cl.
*G06F 3/14* (2006.01)
*G06F 3/0488* (2013.01)

(52) U.S. Cl.
CPC .................................. *G06F 3/04883* (2013.01)

(58) Field of Classification Search
CPC ...................................... G06F 3/14; G06F 3/17
USPC .................. 715/863; 345/1.1, 156, 173, 633; 463/31
See application file for complete search history.

(56) References Cited

U.S. PATENT DOCUMENTS

| 6,765,557 | B1 * | 7/2004 | Segal ..................... G06F 3/0488 345/173 |
| 7,068,843 | B2 | 6/2006 | Chang et al. |
| 8,810,524 | B1 * | 8/2014 | Rosenberg ............ G06F 1/1643 345/1.1 |
| 2004/0193413 | A1 | 9/2004 | Wilson et al. |
| 2010/0277411 | A1 | 11/2010 | Yee et al. |
| 2011/0175802 | A1 * | 7/2011 | Hsieh ....................... G06F 3/017 345/156 |
| 2011/0267262 | A1 * | 11/2011 | Gollier ................... G06F 3/0423 345/156 |
| 2013/0069985 | A1 * | 3/2013 | Wong .................... G02B 27/017 345/633 |
| 2015/0182856 | A1 * | 7/2015 | Mays, III ............. A63F 13/2145 463/31 |

OTHER PUBLICATIONS

Taiwanese language office action dated Apr. 17, 2015, issued in application No. 103113344.

\* cited by examiner

*Primary Examiner* — Ruay Ho

(74) *Attorney, Agent, or Firm* — McClure, Qualey & Rodack, LLP

(57) ABSTRACT

A touch-control system includes at least two image capturing units and an electronic device. The image capturing units are configured to capture a plurality of hand images of a user. The electronic device is coupled to the image capturing units, and configured to recognize a target object from the hand images, and detect motions of the target object in an operating space. The electronic device includes a display unit, and the operating space includes a virtual touch-control plane. When the target object touches a virtual touch-control point on the virtual touch-control plane, the electronic device generates a touch-control signal and performs an associated touch-control operation at a position corresponding to the virtual touch-control points on the display unit.

8 Claims, 10 Drawing Sheets

TOUCH-CONTROL SYSTEM

CROSS REFERENCE TO RELATED APPLICATIONS

This application claims priority of Taiwan Patent Application No. 103113344, filed on Apr. 11, 2014, the entirety of which is incorporated by reference herein.

BACKGROUND OF THE INVENTION

1. Field of the Invention

The present invention relates to image processing, and in particular to a touch-control system and touch-control method thereof capable of recognizing gestures from images to perform touch-control operations.

2. Description of the Related Art

As technologies advance, it is becoming more and more popular to use electronic devices having in-built cameras to recognize gestures. In addition, if a touch-control module is deployed in the display of an electronic device, the cost may increase significantly. Accordingly, there is a demand for a touch-control system capable of recognizing gestures by using cameras and performing touch-control operations on a display without the touch-control function, thereby increasing the convenience of usage and lowering the cost.

BRIEF SUMMARY OF THE INVENTION

A detailed description is given in the following embodiments with reference to the accompanying drawings.

In an exemplary embodiment, a touch-control system is provided. The touch-control system includes: at least two image capturing units, configured to capture a plurality of hand images of a user; and an electronic device, coupled to the image capturing units, configured to recognize a target object from the hand images, and detect motion of the target object in an operating space, wherein the electronic device includes a display unit, and the operating space includes a virtual touch-control plane, wherein when the target object touches a virtual touch-control point on the virtual touch-control plane, the electronic device generates a touch-control signal, and performs an associated touch-control operation at a position corresponding to the virtual touch-control points on the display unit.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
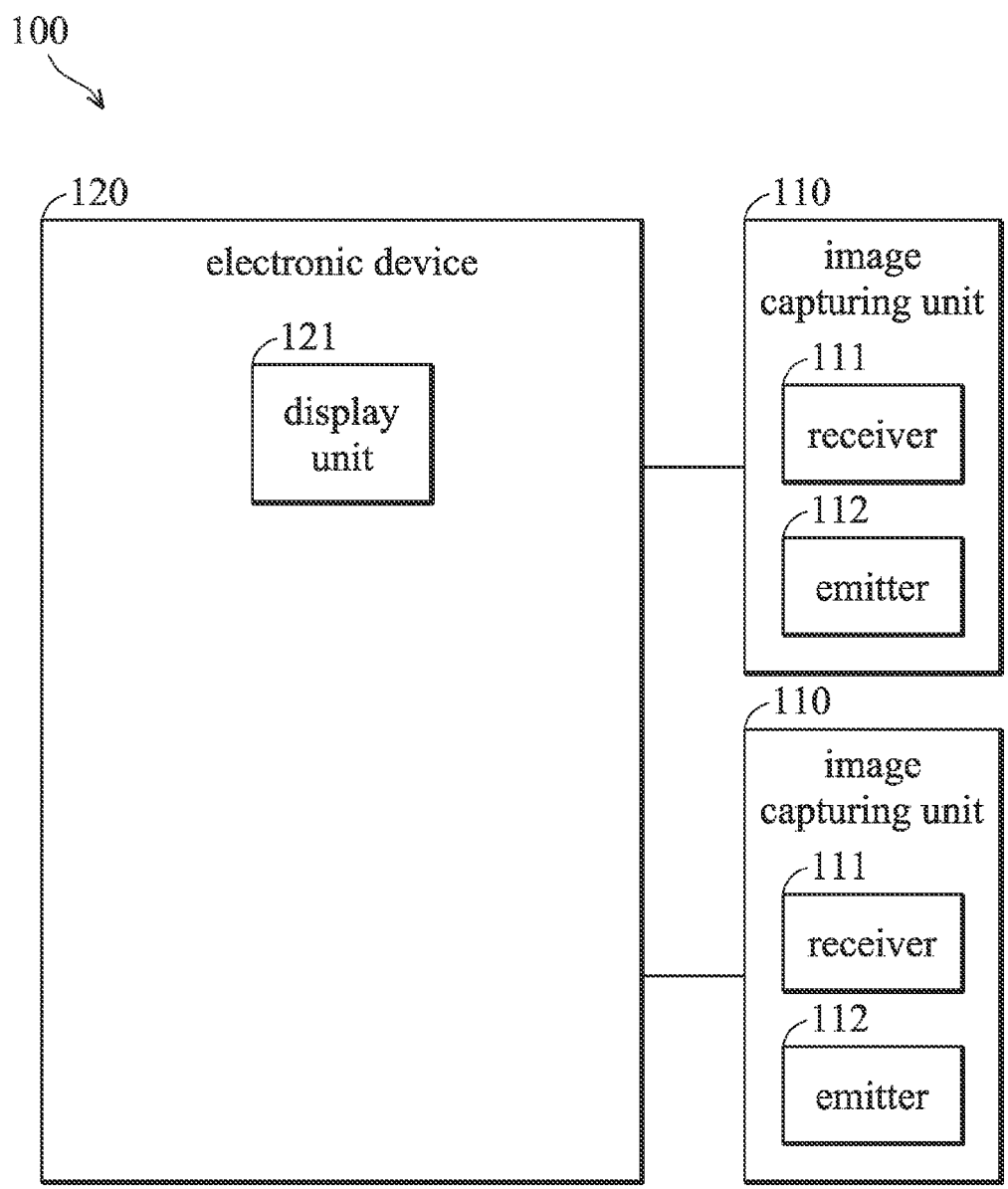
FIG. 1 is a schematic block diagram of a touch-control system 100 in accordance with an embodiment of the invention.

FIG. 1 is a schematic block diagram of a touch-control system 100 in accordance with an embodiment of the invention. As illustrated in FIG. 1, the touch-control system 100 may comprise at least two image capturing units 110, and an electronic device 120. The image capturing units 110 are configured to capture images of a user in front of the electronic device 120. For example, each image capturing unit 110 may comprise a receiver 111 and an emitter 112, wherein the receiver 111 may be a CMOS sensor, and the emitter 112 may be an infrared emitter. The receiver 111 may generate a detection signal by receiving infrared lights from objects, which are emitted by the emitter 112 and reflected or refracted by objects.

The electronic device 120 is coupled to the image capturing units 110, and is configured to analyze the detection signal from the image capturing units 110, thereby obtaining the gestures of the user. In an embodiment, the electronic device 120 may be a personal computer (e.g. a desktop computer, a laptop, an all-in-one computer, etc.), a TV, a video game console, or a display, and the deployed location of the image capturing units 110 may vary depending on the type and structure of the electronic device 120 (details will be described later). In some embodiments, the electronic device 120 further comprises a display unit 121, wherein the display unit 121 may be a monitor or a display without a touch-control module. In some embodiments, image capturing units 110 are not deployed on the electronic device 120 or peripheral apparatuses thereof. For example, the image capturing units 110 may be deployed on a desk or any position capable of taking images of the user's hands.

Figure 2:
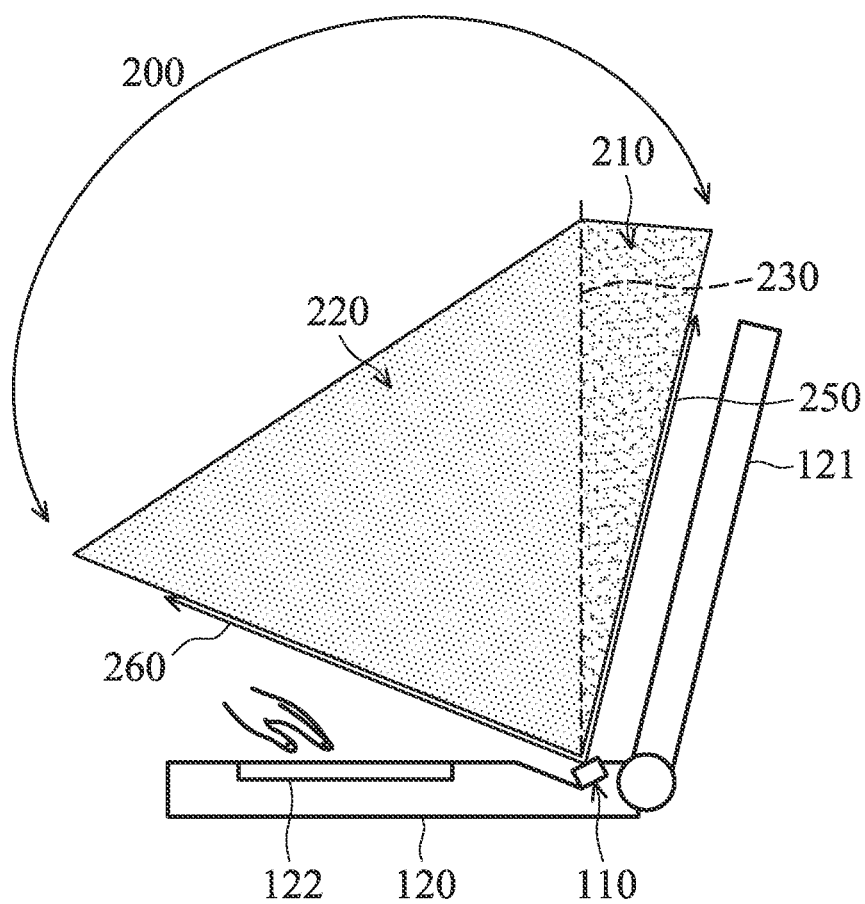
FIG. 2 is a diagram illustrating a three-dimensional space for operating gestures in accordance with an embodiment of the invention.

FIG. 2 is a diagram illustrating a three-dimensional space for operating gestures in accordance with an embodiment of the invention. As illustrated in FIG. 2, the electronic device 120 may be a laptop, for example, and the operating space 200 in front of the display unit 121 of the electronic device 120 can be divided into a touch-control region 210 and a gesture region 220, wherein the touch-control region 210 and the gesture region 220 are separated by a virtual touch-control plane 230. In addition, the detection range and field of view of the image capturing units 110 can be predefined. For example, the detection range may be the region between the radials 250 and 260 toward outer zones. The detection range includes the virtual touch-control plane 230, and the farthest position of the radial 260 may reach the surface of the display unit 121. That is, the operating space 200 may include the surface of the display unit 121. When the user uses the keyboard 122 of the electronic device 120 with his hands, the detection range of the image capturing units 110 can be predefined, thereby preventing the erroneous detection of the hands of the user.

Specifically, the electronic device 120 retrieves the hand position of the user by analyzing the detection signal from the image capturing units 110. In an embodiment, the gestures can be further divided into palm actions and finger actions. When the hand position is located inside the gesture region 220, the electronic device 120 may regard the gestures of the user as palm actions, and the user may control the electronic device 120 with gestures. For example, the gestures can be used to perform actions such as "next page", "viewing", "rotation", etc. If the electronic device 120 is a TV for example, the user may use gestures to control the TV to switch channels, switch between different function pages, adjust the sound volume, etc. If the user's hand enters the touch-control region 210 from the gesture region 220, it indicates that the user's hand has passed through the virtual touch-control plane 230, and the electronic device 120 may further detect the motion of the user's fingers. For example, the electronic device 120 may map a specific region of the virtual touch-control plane 230 to the whole display area of the display unit 121. That is, each position in the specific region has a corresponding position on the screen of the display unit 121. When the user's fingers pass through the virtual touch-control plane 230 and enter the touch-control region 210, the electronic device 120 may determine that the user wants to perform touch-control operations. Meanwhile, the user may tap on the virtual touch-control plane 230 (e.g. at the position A) with a finger, and the electronic device 120 may generate a corresponding touch-control signal at position B on the display unit 121. Afterwards, the electronic device 120 may perform subsequent operations according to the touch-control signal.

Figure 3A:
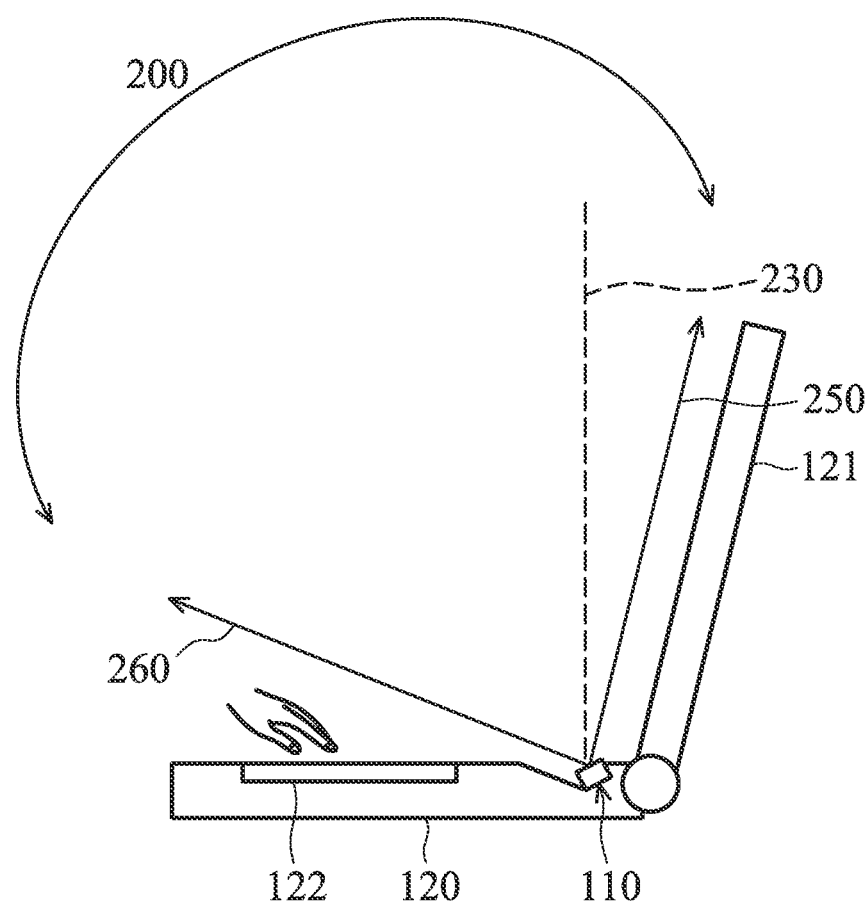
FIGS. 3A~3H are diagrams illustrating the image capturing units 110 deployed on the electronic device 120 in accordance with different embodiments of the invention.
Figure 3B:
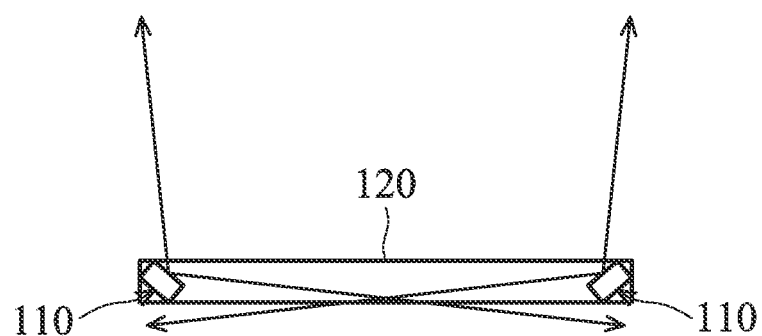

FIGS. 3A~3H are diagrams illustrating the image capturing units 110 deployed on the electronic device 120 in accordance with different embodiments of the invention. In the invention, the image capturing units 110 can be deployed at different locations of the electronic device 120 to detect the hands of the user depending on the type and structure of the electronic device 120. In FIGS. 3A~3E, the image capturing units 110 are connected to the electronic device 120 via a data bus (e.g. a USB interface). For example, as illustrated in FIG. 3A, when the electronic device 120 is a laptop for example, the image capturing units 110 can be deployed on two sides of the joint portion of the base of the laptop and the display unit 121. As illustrated in FIG. 3B, when the electronic device 120 is a laptop or a video game console, the display unit 121 may be placed in a remote location, and the image capturing units 110 may be deployed at two sides of the keyboard 122 of the electronic device 120 (or the video game console), wherein the keyboard 122 is coupled to the electronic device 120 via a USB interface.

Figure 3C:
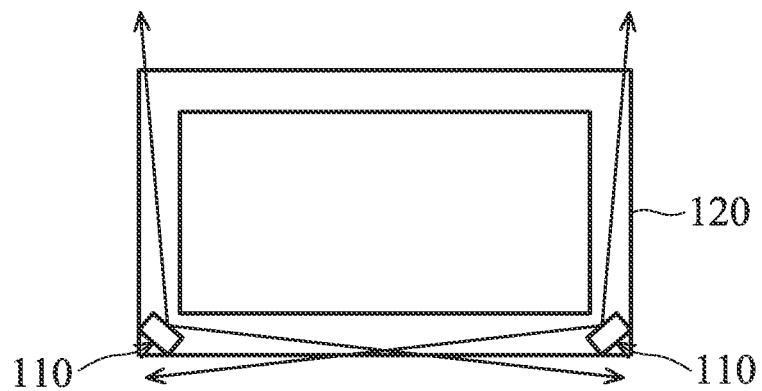
Figure 3D:
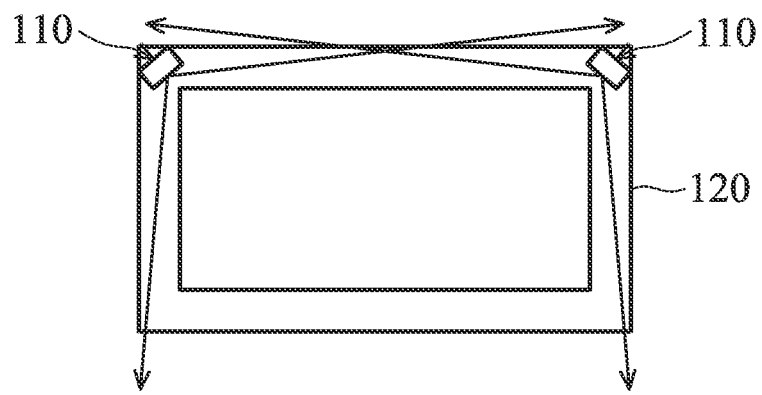
Figure 3E:
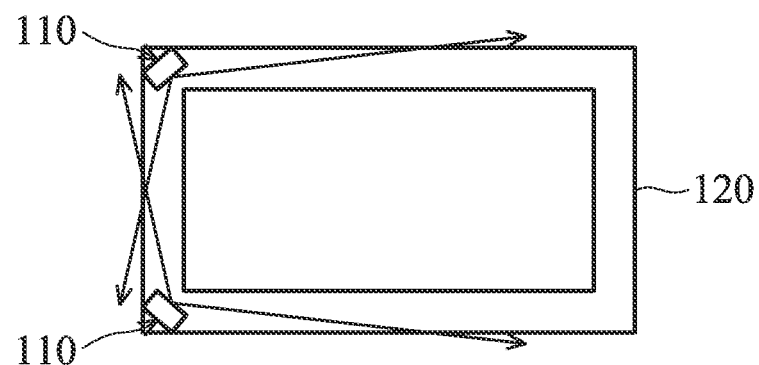
Figure 3F:
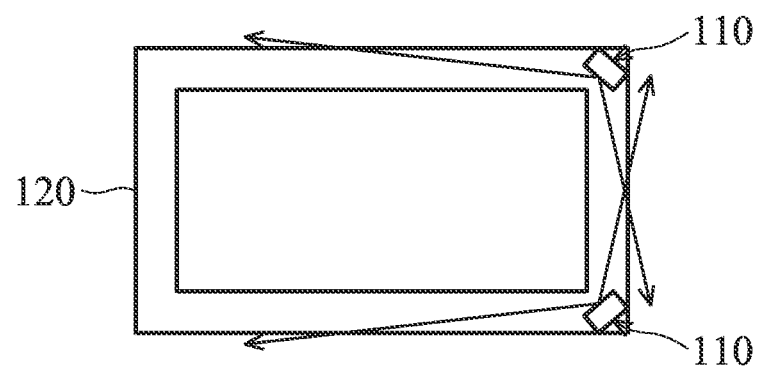
Figure 3G:
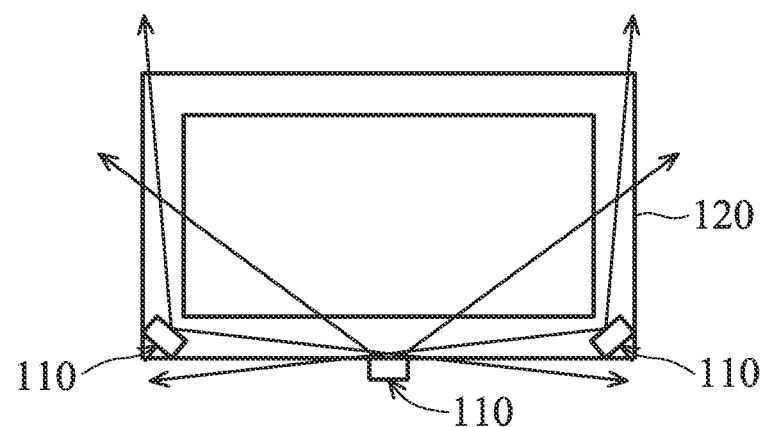
Figure 3H:
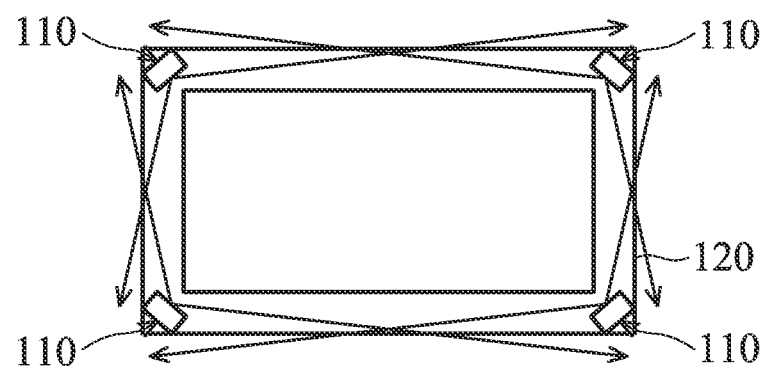

In an embodiment, as illustrated in FIG. 3C, when the electronic device 120 is a TV or a display, the image capturing units 110 may be deployed at the corners of the TV, such as the bottom-left corner and the bottom-right corner. Alternatively, the image capturing units 110 may be deployed at the upper-left/upper-right corners, upper-left/bottom-left corners, and upper-right/bottom-right corners, as shown in FIGS. 3D, 3E and 3F. The user may adjust the deployment location of the image capturing units 110 according to practical needs. In addition, in some embodiments, the number of image capturing units 110 is not limited to two, and two or more image capturing units 110 can be used to detect gestures of the user. For example, as shown in FIG. 3G, the image capturing units 110 are deployed at the bottom-left corner, the bottom-right corner, and the bottom of the electronic device 120. As shown in FIG. 3H, the image capturing units 110 can be deployed at the upper-right corner, the bottom-right corner, the upper-left corner, and the bottom-left corner.

Figure 4A:
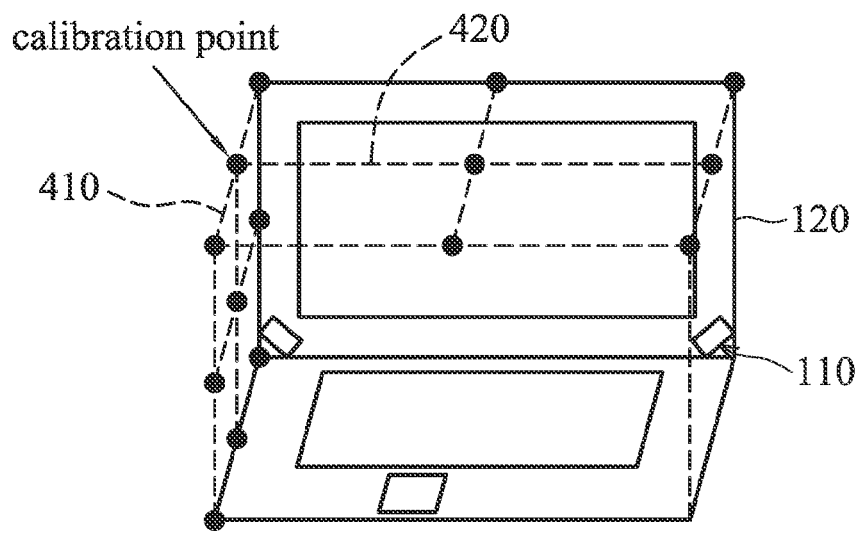
FIGS. 4A and 4B are diagrams illustrating calibration of the operating space of the image capturing units 110 in accordance with an embodiment of the invention.
Figure 4B:
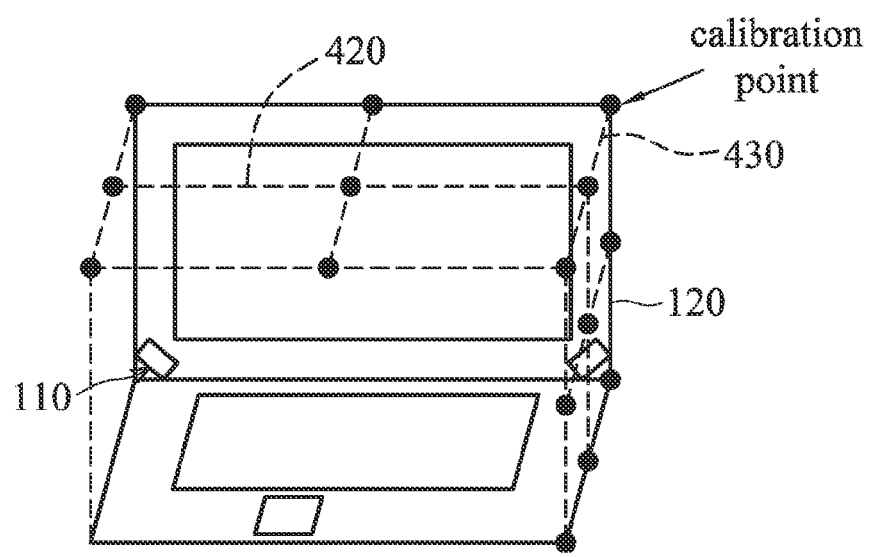
Figure 5:
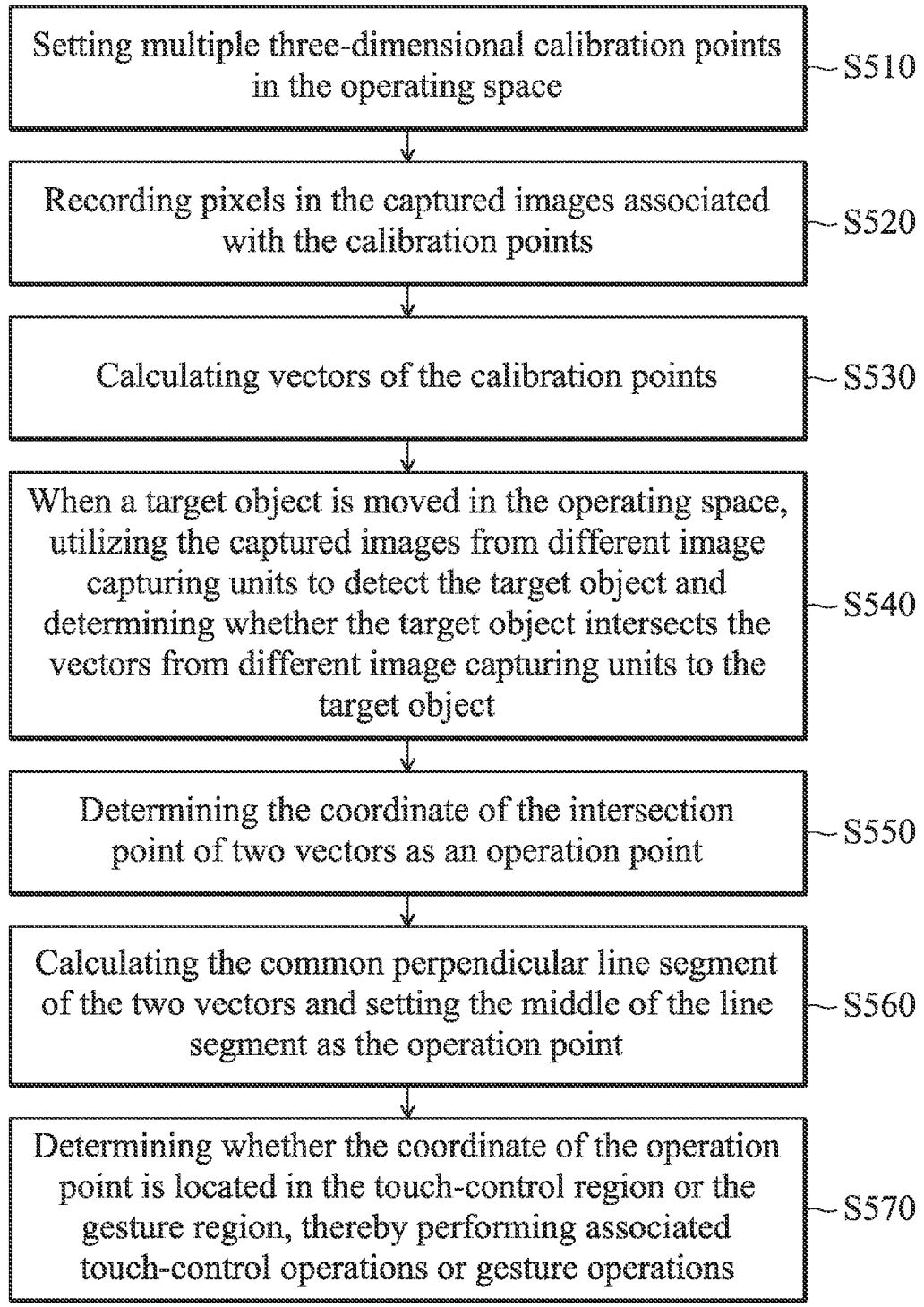
FIG. 5 is a flow chart illustrating a space calibration method in accordance with an embodiment of the invention.

FIGS. 4A and 4B are diagrams illustrating calibration of the operating space of the image capturing units 110 in accordance with an embodiment of the invention. FIG. 5 is a flow chart illustrating a space calibration method in accordance with an embodiment of the invention. Referring to FIG. 4A, FIG. 4B, and FIG. 5, in step S510, the electronic device 120 may predefine multiple three-dimensional calibration points in the operating space 400 of the user. For example, N×N matrix points on different planes of the operating space 400 are set as calibration points. Regarding the image capturing unit 110 deployed at the right side, the calibration points are set on the planes 410 and 420 located at the left side of the operating space 400. Regarding the image capturing unit 110 deployed at the left side, the calibration points are set on the planes 420 and 430 located at the right side of the operating space 400. In step S520, the electronic device 120 may record pixels in the images captured by the image capturing units 110 associated with the calibration points. In step S530, the electronic device 120 may calculate the vectors of the calibration points relative to the deployed position of the image capturing units 110, such as by using interpolation or extrapolation.

In step S540, when a target object is moved by the user in the operating space 400, the electronic device 120 may detect the target object from the images captured by the image capturing units 110, and determine whether the target object intersects the vectors from different image capturing units 110 to the target object. If so, the electronic device 120 may determine the coordinates (x,y,z) of the intersection point of two vectors as an operation point (step S550). If not, it indicates that the two vectors are skew lines (i.e. non-intersecting lines) in the three-dimensional space, and the electronic device 120 may calculate the line segment having the shortest distance between the two vectors (i.e. common perpendicular line segment), and set the middle point of the line segment as the operation point (step S560).

Referring to FIG. 2 and FIG. 5, in step S570, the electronic device 120 may determine whether the coordinate of the operation point is located in the touch-control region 210 or the gesture region 220, thereby performing associated touch-control operations or gesture operations. For example, when the coordinate of the operation point is located in the touch-control region 210, the electronic device 120 may determine the motions of the operation point as touch-control operations. In addition, when the operation point moves across the virtual touch-control plane 230 from the gesture region 220, the electronic device 120 may interpret the movement as a touch-control operation (e.g. a tapping action).

Figure 6:
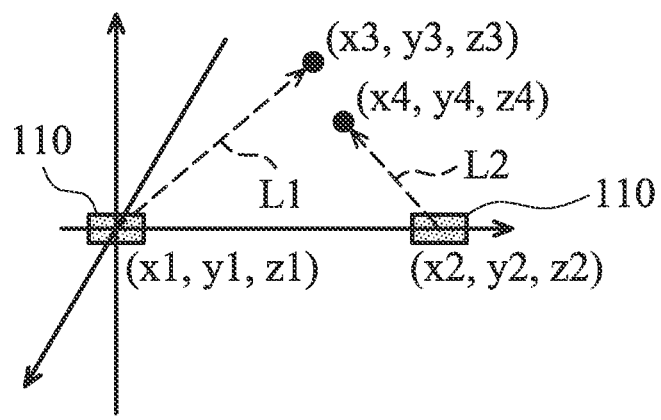
FIG. 6 is a diagram illustrating calculation of the coordinate of a fingertip in the operating space in accordance with an embodiment of the invention.

FIG. 6 is a diagram illustrating calculation of the coordinates of a fingertip in the operating space in accordance with an embodiment of the invention. Referring to FIG. 6, in an embodiment, the coordinates of the image capturing units 110 at the left side and the right side are $(x_1, y_1, z_1)$ and $(x_2, y_2, z_2)$, respectively. The coordinates of the operation points closest to the target object relative to the image capturing unit 110 at the left side are $(x_3, y_3, z_3)$ and $(x_4, y_4, z_4)$, respectively. If lines passing through the image capturing units at the left side and the right side are L1 and L2, respectively, then the vectors of lines L1 and L2 are (a, b, c) and (d, e, f). The vector of the line L1 can be expressed as: $x=x_1+at$; $y=y_1+bt$; $z=z_1+ct$, and the vector of the line L2 can be expressed as: $x=x_2+ds$; $y=y_2+es$; $z=z_2+fs$.

The vectors of the line L1 can be used in the equations of the line L2, and it can be derived that: x1+at=x2+ds; y1+bt=y2+es. Accordingly, the values of t and s can be calculated, and the coordinates (x, y, z) of the intersection point (i.e. the operation point) of the lines L1 and L2 can be obtained. If the values of t and s cannot be obtained, it indicates that the lines L1 and L2 are skew lines in the operating space, and another method is used to calculate the coordinate of the operation point.

Figure 7:
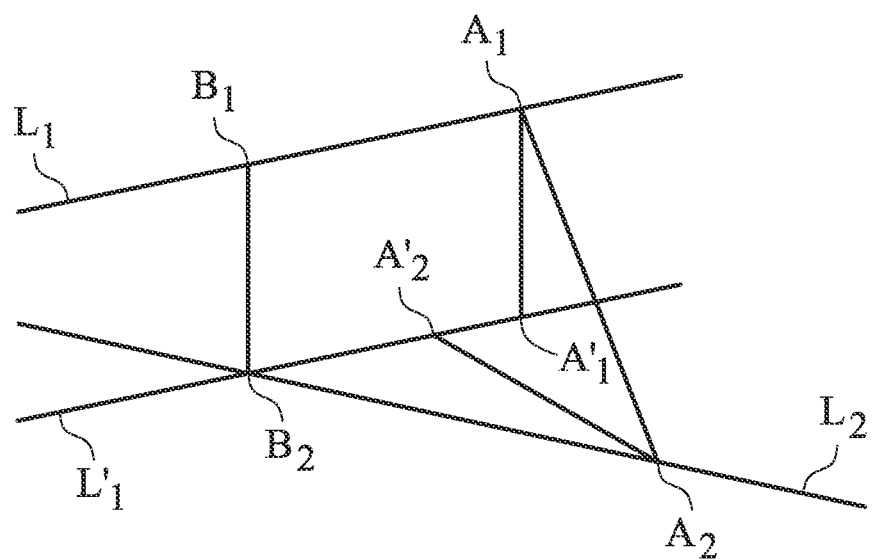
FIG. 7 is a diagram illustrating calculation of the middle point of the common perpendicular of two non-intersecting lines in a three-dimensional space in accordance with an embodiment of the invention.

FIG. 7 is a diagram illustrating calculation of the middle point of the common perpendicular of two non-intersecting lines in a three-dimensional space in accordance with an embodiment of the invention. Referring to FIG. 7, if the lines L1 and L2 pass through the points A1 and A2, respectively, and the direction vector of the lines L1 and L2 are $\vec{d}_1$ and $\vec{d}_2$. The quadrilateral $A_1A_1'B_2B_1$ is a rectangle, and $\angle A_2A_2'B_2 = 90°$. Since the line segment of the common perpendicular is perpendicular to both lines L1 and L2, the length of the line segment $\overrightarrow{B_1B_2}$ and the coordinates of points B1 and B2 can be calculated as follows:

(1) Since The quadrilateral $A_1A_1'B_2B_1$ is a rectangle, orthogonal projection and extrapolation can be used:

$$\overrightarrow{B_2B_1} = \overrightarrow{A_1'A_1} = \frac{\overrightarrow{A_2A_1} \cdot (\vec{d}_1 \times \vec{d}_2)}{|\vec{d}_1 \times \vec{d}_2|^2} (\vec{d}_1 \times \vec{d}_2)$$

$$\overrightarrow{B_1B_2} = \left| \frac{\overrightarrow{A_2A_1} \cdot (\vec{d}_1 \times \vec{d}_2)}{|\vec{d}_1 \times \vec{d}_2|^2} (\vec{d}_1 \times \vec{d}_2) \right|$$

(2) Since $\overrightarrow{A_2A_2'} \perp \overrightarrow{B_2A_1}$, so that $\overrightarrow{A_2A_2'} \cdot \overrightarrow{B_2A_1} = 0$ Furthermore, $\overrightarrow{A_2A_2'} \| \vec{d}_1 \times (\vec{d}_1 \times \vec{d}_2)$ and $\overrightarrow{B_2A_1} = \overrightarrow{A_2A_1} - \overrightarrow{A_2B_2} = \overrightarrow{A_2A_1} - s\vec{d}_2$ It indicates that $[\vec{d}_1 \times (\vec{d}_1 \times \vec{d}_2)] \cdot (\overrightarrow{A_2A_1} - s\vec{d}_2) = 0$ $$s = \frac{\overrightarrow{A_2A_1} \cdot [\vec{d}_1 \times (\vec{d}_1 \times \vec{d}_2)]}{\vec{d}_2 \cdot [\vec{d}_1 \times (\vec{d}_1 \times \vec{d}_2)]}$$

Accordingly, $\overrightarrow{OB_2} = \overrightarrow{OA_2} + s\vec{d}_2$ $$\overrightarrow{OB_1} = \overrightarrow{OB_2} + \overrightarrow{B_2B_1} = \overrightarrow{OB_2} + \frac{\overrightarrow{A_2A_1} \cdot (\vec{d}_1 \times \vec{d}_2)}{|\vec{d}_1 \times \vec{d}_2|^2} (\vec{d}_1 \times \vec{d}_2)$$

When the coordinates of the points B1 and B2 are obtained, given that the coordinates of the point B1 is (x3, y3, z3) and the coordinates of the point B2 is (x4, y4, z4), the coordinates of the middle point of the line segment $\overline{B_1B_2}$ is ((x3+x4)/2, (y3+y4)/2, (z3+z4)/2).

Figure 8A:
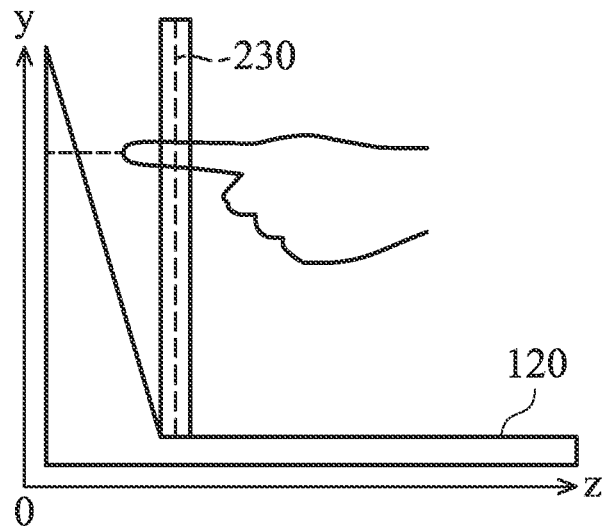
FIGS. 8A and 8B are diagrams illustrating different configurations of the virtual touch-control plane in accordance with different embodiments of the invention.
Figure 8B:
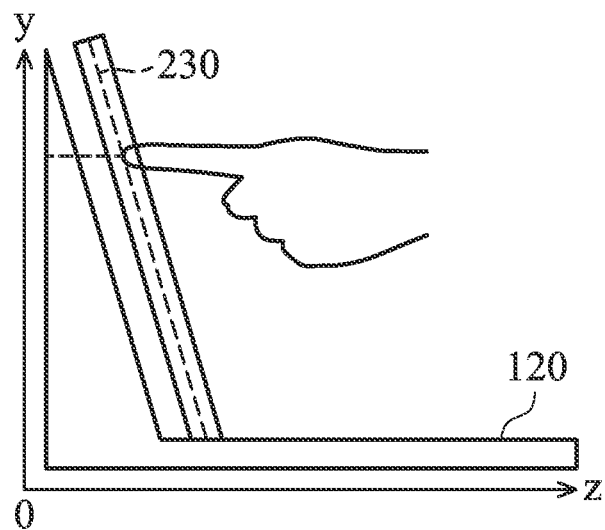

FIGS. 8A and 8B are diagrams illustrating different configurations of the virtual touch-control plane in accordance with different embodiments of the invention. In an embodiment, the electronic device 120 may utilize the image features of the captured images to determine the fingertips of the user and the coordinates thereof, and detect movements of the coordinate of the fingertips in the operating space, thereby determining the gesture of the user such as moving left, moving right, moving forward, or moving backward, etc. It should be noted that prior object detection algorithms can be used to detect the palm or fingertips of the user from the captured images, and the details will be omitted here. In an embodiment, as shown in FIG. 8A, the electronic device is a laptop as an example. Given that the direction from the base of the laptop toward the user is the Z axis and the upper direction perpendicular to the base of the laptop is the Y axis, the position of the virtual touch-control plane 230 is perpendicular to the Z axis and is parallel to the Y axis. When the fingertips of the user moves forward to touch the virtual touch point A1 by passing through the virtual touch-control plane 230, the electronic device 120 may determine that the gesture is a touch-control action, and there is a virtual touch point on the virtual touch-control plane 230, and the electronic device 120 may generate a touch-control signal associated with the virtual touch-control point, and perform a touch-control operation at the corresponding position of the display unit 121. It should be noted that, in the embodiment, the position of the virtual touch-control plane 230 can be calibrated along the Z axis freely. No matter where the virtual touch-control plane 230 is located on the Z axis, when the fingertips of the user move forward by passing through the virtual touch-control plane 230, the electronic device 120 may still determine the gesture is a touch-control action.

In another embodiment, as shown in FIG. 8B, the electronic device 120 is still a laptop as an example. Given that the direction from the base of the laptop toward the user is the axis Z and the upper direction perpendicular to the base of the laptop is the axis Y, there is an angle between the virtual touch-control plane 230 and the Y axis, wherein the degree of the angle can be calibrated freely by the user. In addition, the position of the virtual touch-control plane 230 can be calibrated freely along the Z axis. No matter where the virtual touch-control plane 230 is located at the Z axis, when the fingertips of the user move forward (e.g. moving from right to left in FIG. 8B) by passing through the virtual touch-control plane 230, the electronic device 120 may still determine the gesture is a touch-control action. It should be noted that, in the embodiment, the display unit 121 does not have any touch-control function, and the virtual touch-control plane 230 may be aligned with the display unit 121. That is, the electronic device 120 may determine the touch-control actions which are directly performed on the display unit 121, and perform subsequent operations based on the touch-control actions.

The methods, or certain aspects or portions thereof, may take the form of a program code embodied in tangible media, such as floppy diskettes, CD-ROMs, hard drives, or any other machine-readable (e.g., computer-readable) storage medium, or computer program products without limitation in external shape or form thereof, wherein, when the program code is loaded into and executed by a machine such as a computer, the machine thereby becomes an apparatus for practicing the methods. The methods may also be embodied in the form of a program code transmitted over some transmission medium, such as an electrical wire or a cable, or through fiber optics, or via any other form of transmission, wherein, when the program code is received and loaded into and executed by a machine such as a computer, the machine becomes an apparatus for practicing the disclosed methods. When implemented on a general-purpose processor, the program code combines with the processor to provide a unique apparatus that operates analogously to application-specific logic circuits.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A touch-control system, comprising:
   at least two image capturing units, configured to capture a plurality of hand images of a user; and
   an electronic device, coupled to the image capturing units, configured to recognize a target object from the hand images, and detect motions of the target object in an operating space, wherein the electronic device comprises a display unit, and the operating space comprises a virtual touch-control plane,
   wherein when the target object touches a virtual touch-control point on the virtual touch-control plane, the electronic device generates a touch-control signal, and perform an associated touch-control operation at a position corresponding to the virtual touch-control points on the display unit,
   wherein the operating space comprises a gesture region and a touch-control region, which are separated by the virtual touch-control plane,
   wherein when the target object is located at the gesture region, the electronic device determines the motion of the target object as a gesture.

2. The touch-control system as claimed in claim 1, wherein the electronic device is a personal computer or a TV, and the image capturing units are deployed at two adjacent corners of the display unit of the electronic device.

3. The touch-control system as claimed in claim 1, wherein the electronic device is a personal computer, and the image capturing units are deployed at two opposite sides of a keyboard of the electronic device.

4. The touch-control system as claimed in claim 1, wherein the electronic device is a video game console, and the image capturing units are deployed at two terminals at the same side of the video game console.

5. The touch-control system as claimed in claim 1, wherein the image capturing units comprise a first image capturing unit and a second image capturing unit, and the electronic device further estimates a first vector from the first image capturing unit to the target object and a second vector from the second image capturing unit to the target object, and determines whether the first vector intersects the second vector.

6. The touch-control system as claimed in claim 5, wherein when the first vector intersects the second vector, wherein when the first vector intersects the second vector, the electronic device further calculates an intersection point of the first vector and the second vector in the operating space as an operation point of the target object.

7. The touch-control system as claimed in claim 5, wherein when the first vector does not intersect the second vector, the electronic device further calculate a middle point of a common perpendicular line segment of the first vector and the second vector in the operating space as an operation point.

8. A touch-control system, comprising:
   at least two image capturing units, configured to capture a plurality of hand images of a user; and
   an electronic device, coupled to the image capturing units, configured to recognize a target object from the hand images, and detect motions of the target object in an operating space, wherein the electronic device comprises a display unit, and the operating space comprises a virtual touch-control plane,
   wherein when the target object touches a virtual touch-control point on the virtual touch-control plane, the electronic device generates a touch-control signal, and perform an associated touch-control operation at a position corresponding to the virtual touch-control points on the display unit,
   wherein the operating space comprises a gesture region and a touch-control region, which are separated by the virtual touch-control plane,
   wherein when the target object touches the virtual touch-control points from the gesture region to the touch-control region by passing through the virtual touch-control plane, the electronic device determines the motion of the target object as a touch-control action.

* * * * *